UNITED STATES PATENT OFFICE.

VICTOR TOBIAS AND HEINRICH FISCHER, OF BERLIN, GERMANY.

PREPARING CHOCOLATE.

SPECIFICATION forming part of Letters Patent No. 443,979, dated December 30, 1890.

Application filed August 21, 1890. Serial No. 362,667. (No specimens.)

*To all whom it may concern:*

Be it known that we, VICTOR TOBIAS and HEINRICH FISCHER, merchants, of Berlin, in the Kingdom of Prussia and German Empire, have invented a new and useful Liquid Chocolate, of which the following is a specification.

This invention relates to a new product—that is to say, to a chocolate which is thoroughly free from fat, is liquid, and can be preserved for a very long time. The new product has the peculiarity that whey or poor milk can be used in the manufacture, such milk having not been hitherto found of any use, so that a great economy is realized, while on the other hand the product can be sold at a very low price. The chocolate can be preserved a long time in its sterilized state, it retains its properties in every respect and is enjoyable either cold or warm.

The process of preparing the new chocolate product is as follows: In a suitable and hermetically-closed sterilizing apparatus the whey or poor milk is first placed and heated to boiling-point, after which a quantity of cocoa and sugar mixed in suitable proportions, so as to form a homogeneous mass, is added, the whole mixture being heated to a temperature of about 102° centigrade under suitable pressure and with exclusion of air. The sterilizing apparatus is then cooled by suitable means, whereby the contents are sterilized. During the cooling process the butter contained in the cocoa separates and is removed from the chocolate by passing the cooled mass through a fine sieve, the meshes of which retain the cocoa-butter, but allow the chocolate to flow. The latter, which is now free from oil, is poured into bottles, in which it can be preserved for as long a time as required.

What we claim, and desire to secure by Letters Patent of the United States, is—

The herein-described process for the manufacture of liquid chocolate, consisting of heating whey or poor milk to a boiling-point, then adding a mixture of cocoa and sugar, then cooling the mixture, and then removing the cocoa-butter, substantially as shown and described.

In witness whereof we have hereunto set our hands in presence of two witnesses.

Berlin, this 15th day of July, 1890.

VICTOR TOBIAS.
HEINRICH FISCHER.

Witnesses:
PAUL FISCHER,
WILHELM SCHWICSHAL.